(12) United States Patent
Shu et al.

(10) Patent No.: US 8,262,930 B2
(45) Date of Patent: Sep. 11, 2012

(54) LIQUID CRYSTALLINE MEDIUM AND LIQUID CRYSTAL DISPLAY

(75) Inventors: Martin (Kelun) Shu, Taoyuan (TW); Carol (Yi-Hsuan) Lin, Miaoli (TW); Fred (Jer-Lin) Chen, Taoyuan (TW); Mark Verrall, Taipei (TW)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 136 days.

(21) Appl. No.: 12/933,148

(22) PCT Filed: Mar. 11, 2009

(86) PCT No.: PCT/EP2009/001765
§ 371 (c)(1),
(2), (4) Date: Sep. 17, 2010

(87) PCT Pub. No.: WO2009/115226
PCT Pub. Date: Sep. 24, 2009

(65) Prior Publication Data
US 2011/0019119 A1    Jan. 27, 2011

(30) Foreign Application Priority Data
Mar. 19, 2008 (EP) ..................................... 08005144

(51) Int. Cl.
*C09K 19/52* (2006.01)
(52) U.S. Cl. ................................................. 252/299.01
(58) Field of Classification Search ............... 252/299.1
See application file for complete search history.

(56) References Cited

U.S. PATENT DOCUMENTS

| 2007/0108409 A1 | 5/2007 | Yanai et al. |
| 2008/0083904 A1 | 4/2008 | Wittek et al. |
| 2008/0128653 A1 | 6/2008 | Manabe et al. |
| 2008/0246001 A1 | 10/2008 | Hiroaki |
| 2008/0260971 A1 | 10/2008 | Wittek et al. |

FOREIGN PATENT DOCUMENTS

| DE | 10 2006 019 812 A1 | 11/2006 |
| EP | 1 788 064 A1 | 5/2007 |
| EP | 1 908 811 A1 | 4/2008 |
| WO | WO 2005/123879 A1 | 12/2005 |
| WO | WO 2006/133783 A1 | 12/2006 |

OTHER PUBLICATIONS

International Search Report of PCT/EP2009/001765 (Jun. 12, 2009).

*Primary Examiner* — Phu Vu
(74) *Attorney, Agent, or Firm* — Millen, White, Zelano & Branigan, P.C.

(57) ABSTRACT

The instant invention relates to dielectrically positive nematic media comprising one, two or more compounds of formula I

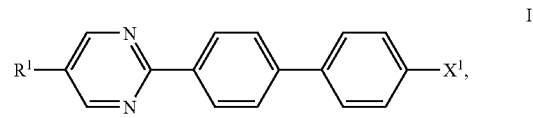

one or more compounds selected from the group of formulae II and III

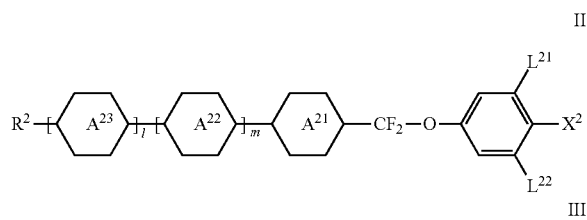

and one or more compounds selected from the group of formulae IV and V

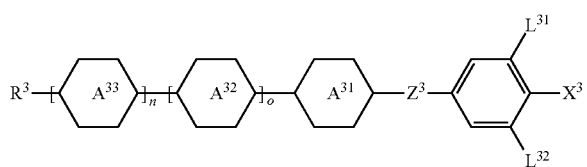

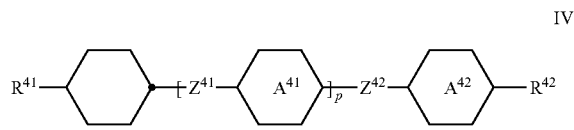

wherein the parameters are as defined in claim 1 with the proviso that the media comprise one or more compounds of formula III, wherein n and o both are 1 and all rings are 1,4-phenylene, which independently of each other optionally are fluorinated once or twice, and/or one or more compounds of formula V, wherein q is 2, as well as to liquid crystal displays comprising these media, especially to TN-displays and in particular to active matrix displays.

16 Claims, No Drawings

LIQUID CRYSTALLINE MEDIUM AND LIQUID CRYSTAL DISPLAY

FIELD OF THE INVENTION

The present invention relates to liquid crystalline media, preferably to dielectrically positive, nematic media, comprising one or more dielectrically neutral compounds and one or more dielectrically positive compounds and to liquid crystal displays comprising these media, especially to displays addressed by an active matrix and in particular to displays of the TN-type.

STATE OF THE ART AND PROBLEM TO BE SOLVED

Liquid Crystal Displays (LCDs) are widely used to display information. LCDs are used for direct view displays, as well as for projection type displays. The electro-optical mode which is employed for most displays still is the twisted nematic (TN)-mode with its various modifications. Besides this mode, the super twisted nematic (STN)— and more recently the optically compensated bend (OCB)- and the electrically controlled birefringence (ECB)-mode with their various modifications, as e.g. the vertically aligned nematic (VAN), the patterned ITO vertically aligned nematic (PVA)-, the polymer stabilized vertically aligned nematic (PSVA)- and the multi domain vertically aligned nematic (MVA)-mode, as well as others, have been increasingly used. All these modes use an electrical field, which is substantially perpendicular to the substrates, respectively to the liquid crystal layer. Besides these modes there are also electro-optical modes employing an electrical field substantially parallel to the substrates, respectively the liquid crystal layer, like e.g. the In Plane Switching (short IPS) mode (as disclosed e.g. in DE 40 00 451 and EP 0 588 568) and the Fringe Field Switching (FFS) mode. Especially the latter mentioned electro-optical modes, which have good viewing angle properties and improved response times, are increasingly used for LCDs for modern desktop monitors and even for displays for TV and for multi media applications and thus are competing with the TN-LCDs.

The liquid crystals according to the present invention are preferably used in improved TN-LCDs with short response times, especially for monitor applications.

For these displays new liquid crystalline media with improved properties are required. Especially the response times have to be improved for many types of applications. Thus liquid crystalline media with improved behaviour are required. Their rotational viscosity should be 60 mPa·s or less, preferably 50 mPa·s or less and especially 40 mPa·s or less. Besides this parameter, the media have to exhibit a suitably wide range of the nematic phase, an appropriate birefringence ($\Delta n$), preferably in the range from 0.100 to 0.140 and a suitably high dielectric anisotropy ($\Delta \epsilon$). $\Delta \epsilon$ has to be high enough to allow a reasonably low operation voltage. Preferably $\Delta \epsilon$ should be higher than 3, in order to allow use of drivers with an operation voltage of 5.5 V to 7.0 V. However, $\Delta \epsilon$ should preferably not be higher than 9 and in particular not higher than 5, as this would be detrimental for an at least reasonably high specific resistivity, which in turn is another requirement, especially for active matrix addressing. Most preferably $\Delta \epsilon$ should be in the range of 3.2 to 4.8 for drivers with an operating voltage of 7.0 V and in the range from 5.5 to 8.5 for drivers with an operating voltage of 5.5 V.

The displays according to the present invention are preferably active matrix LCDs, short AMDs, addressed by an active matrix, preferably by a matrix of thin film transistors (TFTs). However, the inventive liquid crystals can also beneficially be used in displays with other known addressing means.

Liquid crystal compositions suitable for LCDs and in particular for TN-displays are already widely known. These compositions, however, do have significant drawbacks. Most of them, besides having other deficiencies, lead to unfavourably high response times and/or to contrast ratios, which are too low for many applications. They also most generally have insufficient reliability and stability, in particular against exposure to heat, moisture or irradiation by light and in particular UV, especially when one or more these stressors are combined with each other.

Thus, there is a significant need for liquid crystalline media with improved suitable properties for practical applications such as a wide nematic phase range, appropriate optical anisotropy $\Delta n$, according to the display mode used, a high $\Delta \epsilon$, low viscosities, in particular low rotational viscisities ($\gamma_1$), high contrast ratios in displays and especially fast response times and a good reliability.

PRESENT INVENTION

Surprisingly, it now has been found that liquid crystalline media with a suitable phase range, suitably high values of $\Delta \epsilon$ and $\Delta n$ and suitably low viscosities can be realized, which do not exhibit the drawbacks of the materials of the prior art or at least do exhibit them to a significantly lesser degree.

These improved liquid crystalline media according to the instant application comprise at least
one, two or more (dielectrically positive) compounds of formula I

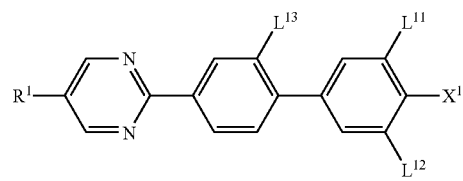

wherein
$R^1$ is alkyl, alkoxy, fluorinated alkyl or fluorinated alkoxy preferably with 1 to 7 C-atoms, alkenyl, alkenyloxy, alkoxyalkyl, fluorinated alkenyl or fluorinated alkenyloxy, more preferably n-alkyl and most preferably has 3 to 5 C-atoms,
$L^{11}$ to $L^{13}$ are independently of each other H or F,
$X^1$ is F or Cl, preferably F,
one, two or more dielectrically positive compounds, preferably having a dielectric anisotropy of more than 3, selected from the group of compounds of formulae II and III, preferably one or more compounds of each of them,

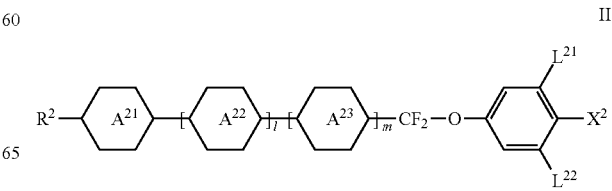

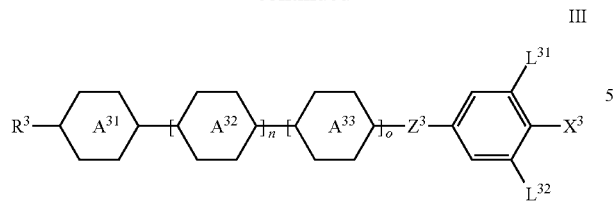

wherein $R^2$ and $R^3$ are independently of each other alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms and $R^2$ and $R^3$ preferably are alkyl or alkenyl,

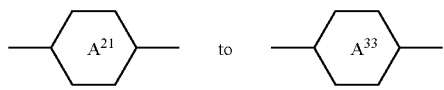

are independently of each other

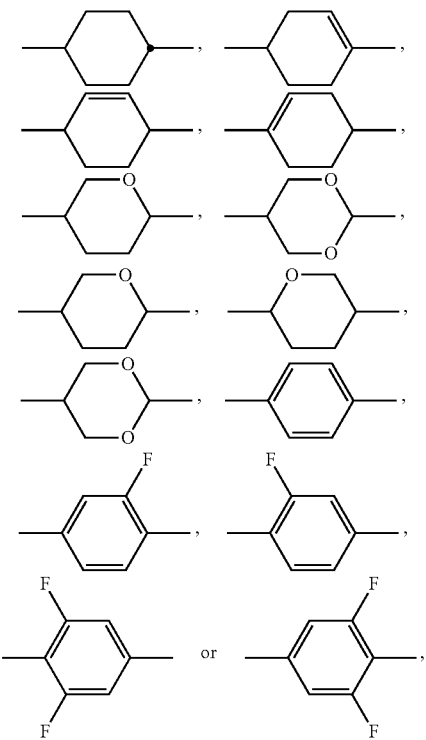

preferably

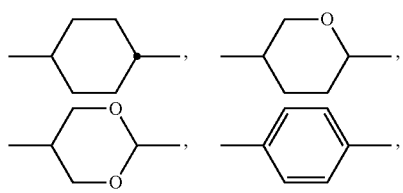

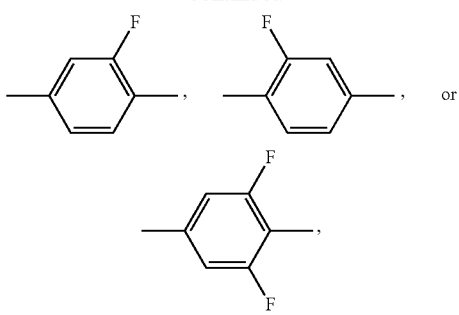

$L_{21}$, $L_{22}$, $L_{31}$, $L_{32}$, are independently of each other H or F, preferably $L^{21}$ and/or $L^{31}$ is F, $X^2$ and $X^3$ are independently of each other halogen, halogenated alkyl or alkoxy with 1 to 3 C-atoms or halogenated alkenyl or alkenyloxy with 2 or 3 C-atoms, preferably F, CL, —$OCF_3$ or —$CF_3$, most preferably F, CL or —$OCF_3$, $Z^3$ is —$CH_2CH_2$—, —$CF_2CF_2$—, —COO—, trans- —CH=CH—, trans- —CF=CF—, —$CH_2O$— or a single bond, preferably —$CH_2CH_2$—, —COO—, trans- —CH=CH— or a single bond and most preferably —COO—, trans- —CH=CH— or a single bond and l, m, n and o are independently of each other 0 or 1 and one, two or more dielectrically neutral compounds selected from the group of formulae IV and V, preferably one or more compounds of each of them,

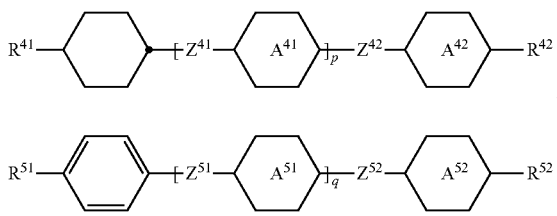

wherein $R^{41}$ to $R^{52}$ independently of each other have the meaning given for $R^2$ under formula II above, preferably $R^{41}$ is alkyl and $R^{42}$ is alkyl or alkoxy or $R^{41}$ is alkenyl and $R^{42}$ is alkyl, preferably $R^{51}$ is alkyl and $R^{52}$ is alkyl or alkenyl, or $R^{51}$ is alkenyl and $R^{52}$ is alkyl or alkenyl, preferably alkyl,

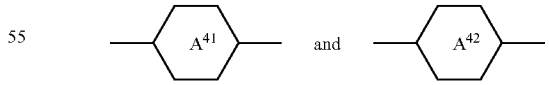

independently of each other and in case is present twice, also these independently of each other are

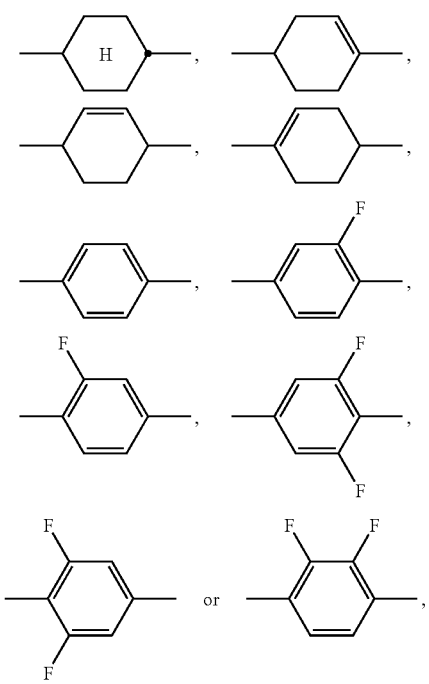

preferably at least one of

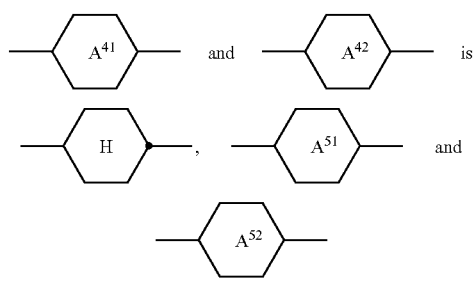

independently of each other and in case

is present twice, also these independently of each other are

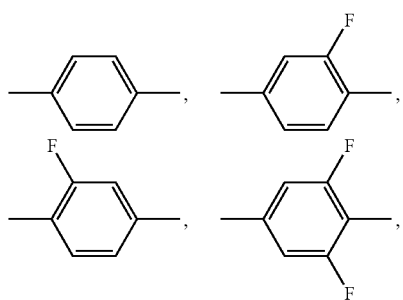

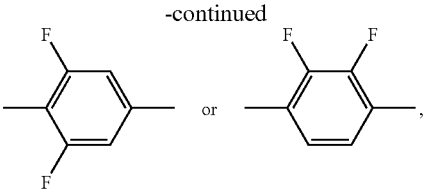

preferably at least one of

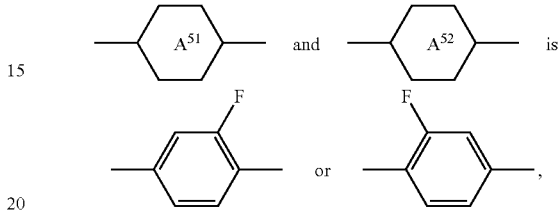

$Z^{41}$ to $Z^{52}$ independently of each other, and in case $Z^{41}$ and/or $Z^{51}$ is/are present twice, also these independently of each other, are —CH$_2$CH$_2$—, —COO—, trans- —CH=CH—, trans- —CF=CF—, —CH$_2$O—, —CF$_2$O—, —C≡C— or a single bond, preferably at least one of $Z^{41}$ and $Z^{42}$ and at least one of $Z^{51}$ and $Z^{52}$ each is a single bond, p and q are independently of each other 0, 1 or 2, P preferably is 0 or 1, with the proviso that the medium comprises one or more compounds of formula III, wherein n and o both are 1, $Z^3$ preferably is a single bond, and all rings are 1,4-phenylene, which independently of each other optionally are fluorinated once or twice, and/or one or more compounds of formula V, wherein q is 2 and $Z^{51}$ and $Z^{51}$ preferably are both a single bond.

In a preferred embodiment of the present invention the liquid crystalline media according to the instant application comprise one or more compounds of formula I selected from the compounds of its sub-formulae I-1 to I-3

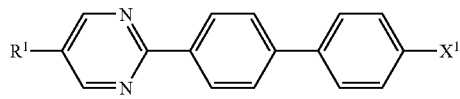
I-1

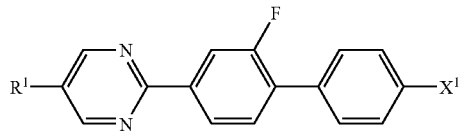
I-2

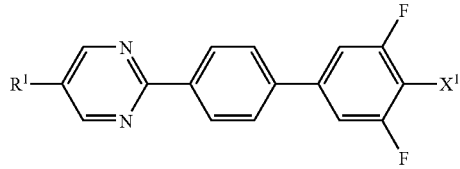
I-3 wherein the parameters have the respective meanings given under formula I above and preferably $R^1$ is alkyl, most preferably n-alkyl, and $X^1$ preferably is F.

In a preferred embodiment of the present invention the liquid crystalline media according to the instant application comprise one or more compounds selected from the group of compounds of formulae II-1 and II-2, preferably of formula II-2

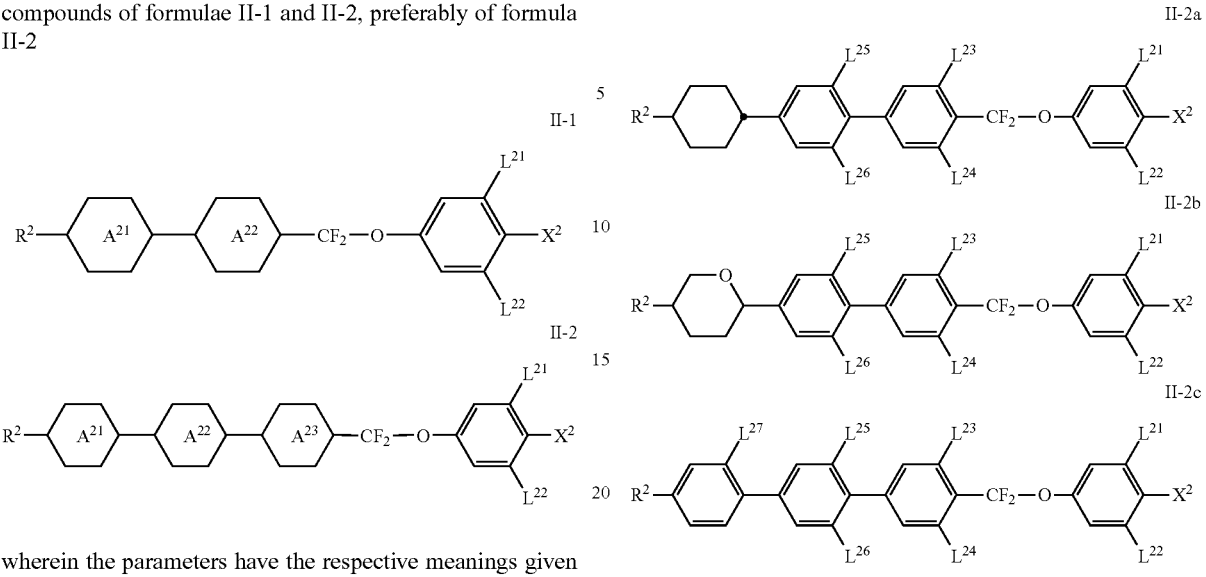

wherein the parameters have the respective meanings given under formula II above and $X^2$ is preferably F or —$OCF_3$.

Preferably the media comprise one or more compounds selected from the group of compounds of formulae II-1 and II-2, wherein $L^{21}$ and $L^{22}$ both are F.

Preferably the media comprise one or more compounds of formula II-1, which preferably are selected from the group of compounds of formulae II-1a to II-1c wherein the parameters have the respective meanings given above and preferably
$L^{21}$ and $L^{22}$ are both F and $L^{32}$ and $L^{24}$ are both H or
$L^{21}$, $L^{22}$, $L^{23}$ and $L^{24}$ are all F.

In a preferred embodiment the media comprise one or more compounds of formula II-1c, wherein $L^{21}$, $L^{22}$, $L^{23}$ and $L^{24}$ all are F.

Preferably the media comprise one or more compounds selected from the group of compounds of formulae II-2a to II-2c, preferably of formula II-2c,

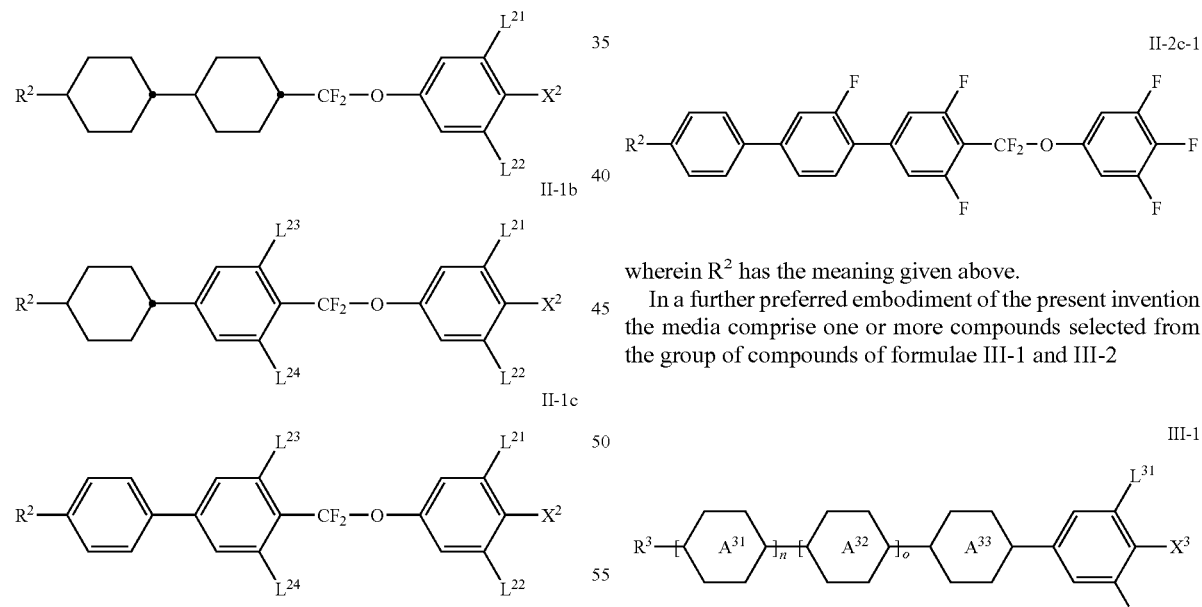

wherein the parameters have the respective meanings given above and $L^{23}$ to $L^{27}$ are independently of each other and of the other parameters H or F and preferably $L^{21}$ and $L^{22}$ are both F and two or three of $L^{23}$ to $L^{27}$, most preferably $L^{23}$ to $L^{25}$, are F and the others of $L^{21}$ to $L^{27}$ are H or F, preferably H and $X^2$ is preferably F or —$OCF_3$ and most preferably F.

Especially preferred compounds of formula II-2 are the compounds of formula II-2c-1

II-2c-1

$R^2$—⟨◯⟩—⟨◯⟩(F)—⟨◯⟩(F)—$CF_2$—O—⟨◯⟩(F,F)—F
         (F)

wherein $R^2$ has the meaning given above.

In a further preferred embodiment of the present invention the media comprise one or more compounds selected from the group of compounds of formulae III-1 and III-2

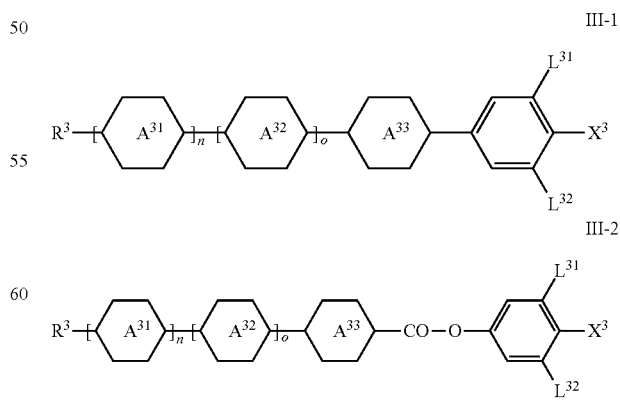

wherein the parameters have the respective meanings given under formula III above.

Preferably the media comprise one or more compounds of formula III-1, preferably selected from the group of compounds of formulae III-1a to III-1d, preferably of formulae III-1c and/or III-1d and most preferably of formula III-1d

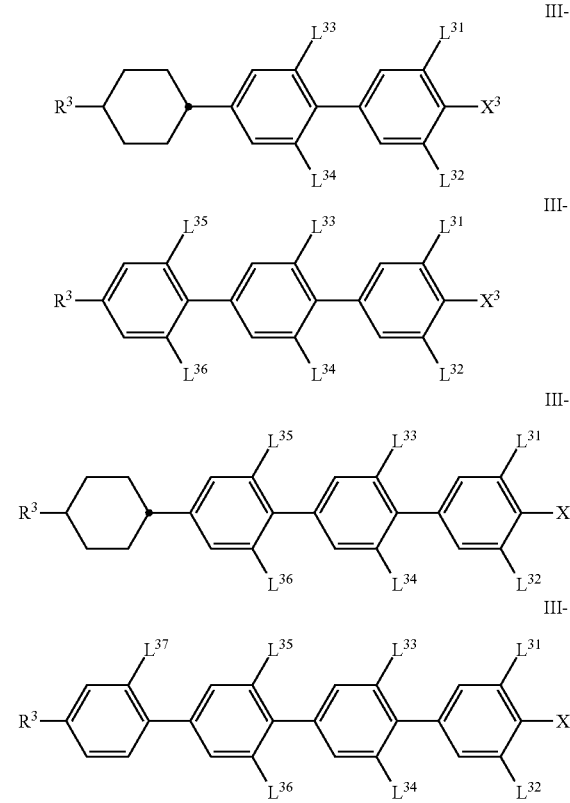

III-1a

III-1b

III-1c

III-1d wherein the parameters have the respective meanings given above and $L^{33}$ to $L^{37}$ are independently of each other and of the other parameters H or F and preferably $L^{31}$ and $L^{32}$ are both F and two or three of $L^{33}$ to $L^{37}$ most preferably $L^{33}$ to $L^{35}$, are F and the others of $L^{31}$ to $L^{37}$ are H or F, preferably H and $X^3$ is preferably F or —OCF$_3$.

Most preferable compounds of formula III-1 are selected from the group of compounds of formulae III-1c-1, III-1c-2, III-1d-1 and III-1d-2, preferably of formulae III-1c-2 and/or III-1d-1,

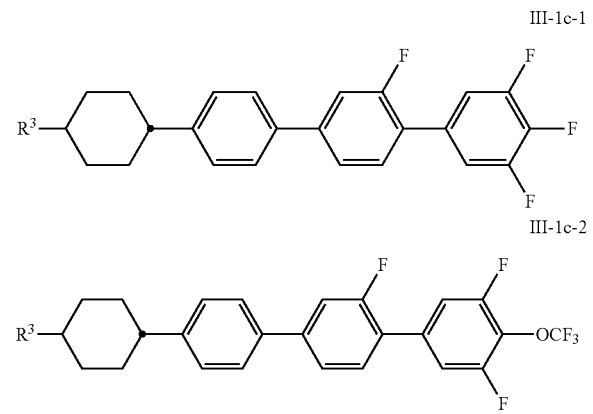

III-1c-1

III-1c-2

III-1d-1

III-1d-2 wherein $R^3$ has the meaning given above.

Preferably the compounds of formula IV are selected from the group of compounds of formulae IV-1 to IV-5, more preferably of formulae IV-1 and IV-2 and most preferably of formula IV-1,

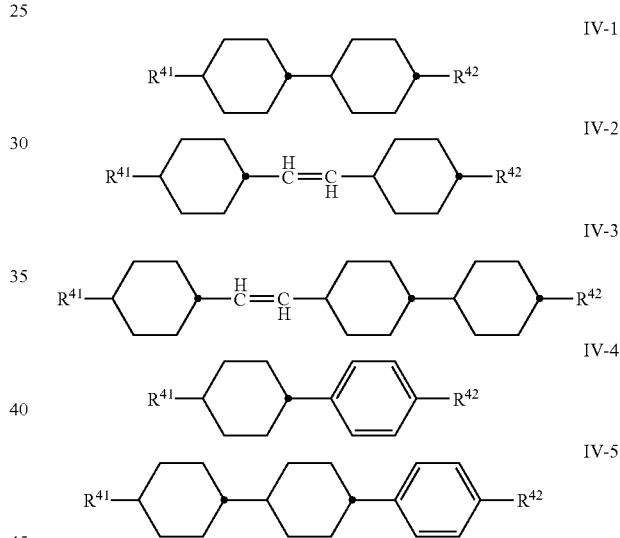

IV-1

IV-2

IV-3

IV-4

IV-5 wherein $R^{41}$ and $R^{42}$ have the respective meanings given under formula IV above and generally and in particular in formulae IV-1 and IV-5, $R^{41}$ preferably is alkyl or alkenyl, preferably alkenyl and $R^{42}$ preferably is alkyl or alkenyl, preferably alkyl and alternatively in formula IV-2 $R^{41}$ and $R^{42}$ preferably both are alkyl and in formula IV-4 $R^{41}$ preferably is alkyl or alkenyl, preferably alkyl and $R^{42}$ preferably is alkyl or alkoxy, preferably alkoxy.

Preferably the media comprise one or more compounds selected from the group of compounds of formulae IV-1, IV-4 and IV-5 and, most preferably, one or more compounds of formula IV-1.

Preferred compounds of formula IV-1 are compounds of formulae CC-n-V and CC-n-Vm, more preferably of formula CC-3-V, CC-3-V1, CC-4-V and CC-5-V. The definitions of these abbreviations (acronyms) are explained in tables A to C and illustrated in table D below.

In a preferred embodiment the liquid crystalline media according to the present invention comprise one or more compounds of formula V selected from the group of compounds of formulae V-1 to V-3

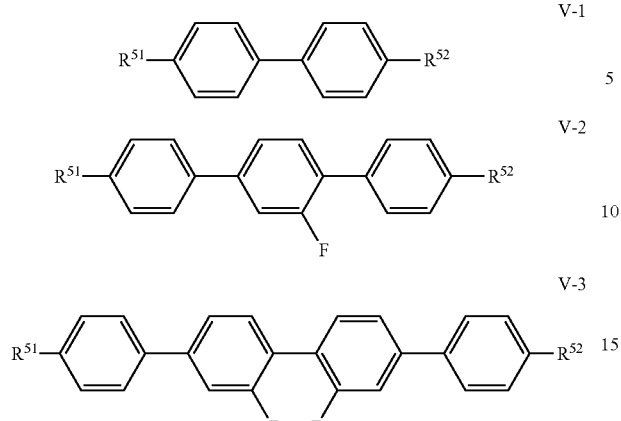

V-1

V-2

V-3 wherein $R^{51}$ and $R^{52}$ have the respective meanings given under formula V above and $R^{51}$ preferably is alkyl, more preferably n-alkyl and in formula V-1 $R^{52}$ preferably is alkenyl, preferably 3-alkenyl and most preferably —$(CH_2)_2$—CH=CH—$CH_3$ and in formula V-2 $R^{52}$ preferably is alkyl or alkenyl, preferably n-alkyl or 3-alkenyl and most preferably —$(CH_2)_2$—CH=$CH_2$ and in formula V-3 $R^{52}$ preferably is alkyl.

Preferred compounds of formula V-1 are compounds of formula PP-n-2Vm, more preferably of formula PP-1-2V1. Preferred compounds of formula V-2 are compounds of formulae PGP-n-m, PGP-n-2V and PGP-n-2Vm, more preferably of formulae PGP-2-m, PGP-3-m and PGP-n-2V. Preferred compounds of formula V-3 are compounds of formulae PGGIP-n-m. The definitions of these abbreviations (acronyms) are explained in tables A to C and illustrated in table D below.

Alternatively or additionally to compounds of formulae II and/or III the media according to the present invention may comprise one or more dielectrically positive compounds of formula VI

VI

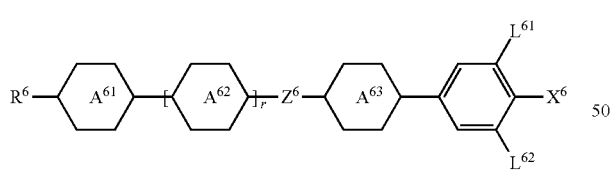

wherein $R^6$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms and preferably is alkyl or alkenyl,

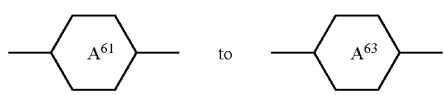

are independently of each other

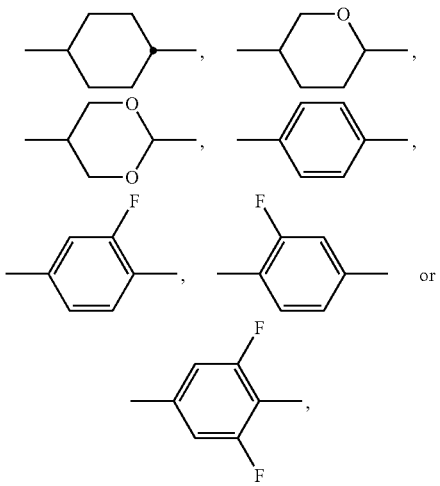

$L^{61}$ and $L^{62}$ are independently of each other H or F, preferably $L^{61}$ is F, $X^6$ is halogen, halogenated alkyl or alkoxy with 1 to 3 C-atoms or halogenated alkenyl or alkenyloxy with 2 or 3 C-atoms, preferably F, Cl, —$OCF_3$ or —$CF_3$, most preferably F, Cl or —$OCF_3$, $Z^6$ is —$CH_2CH_2$—, —$CF_2CF_2$—, —COO—, trans- —CH=CH—, trans- —CF=CF— or —$CH_2O$—, preferably —$CH_2CH_2$—, —COO— or trans- —CH=CH— and most preferably —COO— or —$CH_2CH_2$— and r is 0 or 1.

The compounds of formula VI are preferably selected from the group of compounds of formulae VI-1 and VI-2, preferably of formula VI-1

VI-1

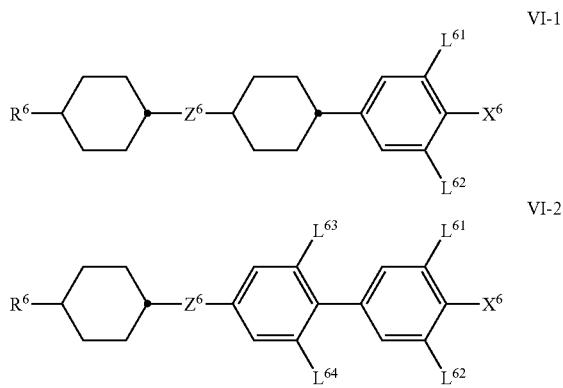

VI-2 wherein the parameters have the respective meanings given above and the parameters $L^{63}$ and $L^{64}$ are, independently of each other and of the other parameters H or F and preferably $Z^6$ is —$CH_2$—$CH_2$— and preferably $X^6$ is F.

Preferably the liquid crystalline media according to the instant invention comprise, more preferably predominantly consist of, more preferably essentially consist of and most preferably entirely consist of compounds selected from the group of compounds of formulae I to VI, more preferably of formulae I to V.

"Comprising" in this application means in the context of compositions that the entity referred to, e.g. the medium or the component, contains the component or components or of the compound or compounds in question, preferably in a total concentration of 10% or more and most preferably of 20% or more unless explicitly defined otherwise.

In this context the term "predominantly consisting of" means that the entity referred to contains 55% or more, preferably 60% or more and most preferably 70% or more of the component or components or of the compound or compounds in question unless explicitly defined otherwise.

In this context the term "essentially consisting of" means that the entity referred to contains 80% or more, preferably 90% or more and most preferably 95% or more of the component or components or of the compound or compounds in question unless explicitly defined otherwise.

In this context the term "entirely consisting of" means that the entity referred to contains 98% or more, preferably 99% or more and most preferably 100.0% of the component or components or of the compound or compounds in question unless explicitly defined otherwise.

Also other mesogenic compounds, which are not explicitly mentioned above, can optionally and beneficially be used in the media according to the instant invention. Such compounds are known to the expert in the field.

The liquid crystal media according to the instant invention are characterised by a clearing point of 70° C. or more, preferably of 75° C. or more.

The $\Delta n$, at 589 nm ($Na^D$) and 20° C., of the liquid crystal media according to the instant invention preferably is in the range of 0.110 or more to 0.150 or less, more preferably in the range of 0.120 or more to 0.140 or less and most preferably in the range of 0.125 or more to 0.135 or less.

The $\Delta\epsilon$, at 1 kHz and 20° C., of the liquid crystal medium according to the invention preferably is 2.5 more, more preferably 3.0 more and most preferably 3.5 or more, whereas it preferably is 9.0 or less, more preferably 8.0 or less and most preferably it is in the range of 3.2 to 4.8 for drivers with an operating voltage of 7.0 V and in the range from 5.5 to 8.5 for drivers with an operating voltage of 5.5 V.

Preferably the nematic phase of the inventive media extends at least from 0° C. or less to 70° C. or more, more preferably at least from −20° C. or less to 70° C. or more, most preferably at least from −20° C. or less to 75° C. or more and in particular at least from −30° C. or less to 75° C. or more.

The liquid crystalline media are preferably used in displays operating in the first transmission minimum according to Gooch and Tarry. The displays preferably have an optical retardation (d·$\Delta n$) in the range of 0.35 $\mu m^{-1}$ or more to 0.60 $\mu m^{-1}$ or less, more preferably of 0.37 $\mu m^{-1}$ or more to 0.50 $\mu m^{-1}$ or less and, most preferably of 0.40 $\mu m^{-1}$ or more to 0.45 $\mu m^{-1}$ or less.

The displays according to the present application preferably have a cell gap in the range of 3.0 $\mu m$ or more to 4.0 $\mu m$ or less, more preferably of 3.1 $\mu m$ or more to 3.7 $\mu m$ or less and, most preferably of 3.2 $\mu m$ or more to 3.5 $\mu m$ or less.

Preferably the liquid crystal media contain 50% to 100%, more preferably 70% to 100% more preferably 80% to 100% and in particular 90% to 100% totally of compounds of formulae I, II, III, IV, V and VI, preferably of formulae I, II, III, IV and V.

More preferably the liquid crystal media comprise, more preferably predominantly consist of, more preferably essentially consist of and most preferably entirely consist of compounds of formulae I, II, III, IV, V and VI, preferably of formulae I, II, III, IV and V.

Compounds of formula I preferably are used in the media in a total concentration from 1% to 35%, more preferably from 2% to 30%, more preferably from 3% to 20% and most preferably from 5% to 15% of the total mixture.

Compounds of formulae II and III preferably are used in the media in a total concentration from 5% to 20%, more preferably from 7% to 18% and most preferably from 10% to 15% of the total mixture.

Compounds of formula II preferably are used in the media in a total concentration from 1% to 10%, more preferably from 2% to 7% and most preferably from 3% to 6% of the total mixture.

Compounds of formula III preferably are used in the media in a total concentration from 1% to 15%, more preferably from 2% to 10% and most preferably from 3% to 9% of the total mixture.

Compounds of formula III-1d-1, which are preferably used in the media, preferably are used in a total concentration from 0.1% to 4%, more preferably from 0.2% to 2% and most preferably from 0.3% to 1.0% of the total mixture.

Compounds of formula III-1d-2, which are most preferably used in the media, preferably are used in a total concentration from 0.1% to 4%, more preferably from 0.2% to 2% and most preferably from 0.3% to 1.0% of the total mixture.

Compounds of formula IV preferably are used in the media in a total concentration from 40% to 60%, more preferably from 50% to 60% and most preferably from 52% to 57% of the total mixture.

Compounds of formula V preferably are used in the media in a total concentration from 20% to 30%, preferably from 22% to 28% and most preferably from 23% to 27% of the total mixture.

Compounds of formula VI preferably are used in the media in a total concentration from 0% to 30%, preferably from 0% to 15% and most preferably from 1% to 10% of the total mixture.

Optionally the media according to the present invention may comprise further liquid crystal compounds in order to adjust the physical properties. Such compounds are known to the expert. Their concentration in the media according to the instant invention is preferably 0% to 30%, more preferably 0.1% to 20% and most preferably 1% to 15%.

Preferably the media according to the present invention comprise one or more compounds of
  formula I-1 and/or
  formula II-2a and/or
  formula II-2c, preferably of formulae III-2c-1, and/or
  formula III-1c, preferably of formulae III-1c-2, and/or
  formula III-1d, preferably of formulae III-1d-1, and/or
  formula III-1h, preferably of formula III-1h-3 and/or
  formula IV-1, preferably of formulae CC-n-V and/or CC-n-Vm, and/or
  formula V-1, preferably of formula PP-n-mVI, and/or
  formula V-2, preferably of formulae PGP-n-m and/or PGP-n-mV and/or
  formula V-3, preferably of formula PGGIP-n-m.

Most preferably the media comprise one or more compounds of formula III-1d and/or of formula V-3.

In the present application the term dielectrically positive means compounds or components with $\Delta\epsilon > 3.0$, dielectrically neutral with $-1.5 \leq \Delta\epsilon \leq 3.0$ and dielectrically negative with $\Delta\epsilon < -1.5$. $\Delta\epsilon$ is determined at a frequency of 1 kHz and at 20° C. The dielectric anisotropy of the respective compound is determined from the results of a solution of 10 of the respective individual compound in a nematic host mixture. In case the solubility of the respective compound in the host mixture is less than 10% its concentration is reduced by a factor of 2 until the resultant mixture is stable enough at least to allow the determination of its properties. Preferably the concentration is kept at least at 5%, however, in order to keep the significance of the results a high as possible. The capacities of the test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V, however, it is always selected to be below the capacitive threshold of the respective test mixture.

$\Delta \in$ is defined as $(\in_{\parallel} - \in_{\perp})$, whereas $\in_{av.}$ is $(\in_{\parallel} + 2\in_{\perp})/3$.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest. The values are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast $(V_{10})$ and the term saturation voltage refers to the optical saturation and is given for 90 relative contrast $(V_{90})$ both, if not explicitly stated otherwise. The capacitive threshold voltage $(V_0)$, also called Freedericks-threshold $(V_{Fr})$ is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta \in$) is determined at a frequency of 1 kHz. The threshold voltages, as well as all other electro-optical properties have been determined with test cells prepared at Merck KGaA, Germany. The test cells for the determination of $\Delta \in$ had a cell gap of approximately 20 μm. The electrode was a circular ITO electrode with an area of 1.13 cm² and a guard ring. The orientation layers were lecithin for homeotropic orientation ($\in_{\parallel}$) and polyimide AL-1054 from Japan Synthetic Rubber for homogeneuous orientation ($\in_{\perp}$). The capacities were determined with a frequency response analyser Solatron 1260 using a sine wave with a voltage of 0.3 $V_{rms}$. The test cells used have cell gap selected to have an optical retardation matching the first transmission minimum according to Gooch and Tarry or below, typically of about 0.45 μm⁻¹. The light used in the electro-optical measurements was white light. The set up used was commercially available equipment of Autronic Melchers, Germany. The characteristic voltages have been determined under perpendicular observation. The threshold ($V_{10}$)—mid grey ($V_{50}$)—and saturation ($V_{90}$) voltages have been determined for 10%, 50% and 90% relative contrast, respectively.

The response times are given as rise time ($\tau_{on}$) for the time for the change of the relative contrast from 0% to 90% ($t_{90}-t_0$), i.e. including the delay time ($t_{10}-t_0$), as decay time ($\tau_{off}$) for the time for the change of the relative contrast from 100% back to 10% ($t_{100}-t_{10}$) and as the total response time ($\tau_{total}$) = $\tau_{on} + \tau_{off}$), respectively.

The liquid crystal media according to the present invention may contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application. This also holds for the concentration of the dichroic dyes used in the mixtures, which are not counted when the concentrations of the compounds respectively the components of the host mixture are specified. The concentration of the respective additives is always given relative to the final doped mixture.

The inventive liquid crystal media according to the present invention consist of several compounds, preferably of 3 to 30, more preferably of 4 to 20 and most preferably of 4 to 16 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-AMD, VAN-AMD, IPS and OCB LCDs and in particular in composite systems, like PDLC, NCAP, PN LCDs and especially in ASM-PA LCDs.

The melting point T(C,N), the transition from the smectic (S) to the nematic (N) phase T(S,N) and the clearing point T(N,I) of the liquid crystals are given in degrees centigrade.

In the present application and especially in the following examples, the structures of the liquid crystal compounds are represented by abbreviations, which are also called "acronyms". The transformation of the abbreviations into the corresponding structures is straight forward according to the following three tables A to C.

All groups $C_nH_{2n+1}$, $C_mH_{2m+1}$ and $C_lH_{2l+1}$ are preferably straight chain alkyl groups with n, m and l C-atoms, respectively and —CH═CH— preferably is trans- respectively E vinylene.

Table A lists the symbols used for the ring elements, table B those for the linking groups and table C those for the symbols for the left hand and the right hand end groups of the molecules.

Table D lists exemplary molecular structures together with their respective codes.

TABLE A

Ring Elements

C 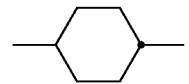

TABLE A-continued
| | Ring Elements | | | Ring Elements |
|---|---|---|---|---|
| D | 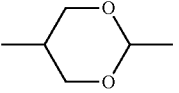 | | o2f | 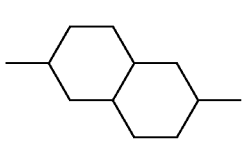 |
| A | 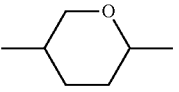 | | dh | 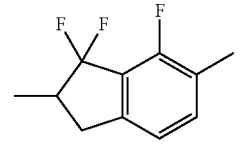 |
| G | 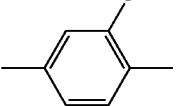 | | K |  |
| U | 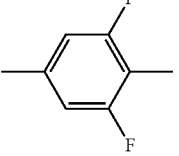 | | L | 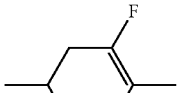 |
| Y | 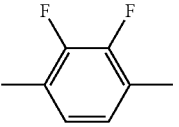 | | F |  |
| M | 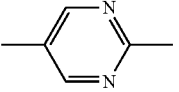 | | P | 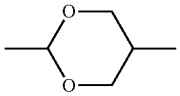 |
| N | 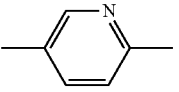 | | Dl | 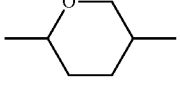 |
| np | 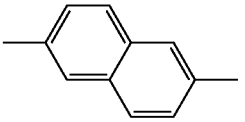 | | Al | 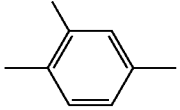 |
| n3f | 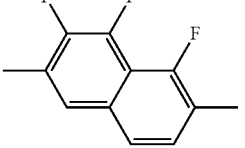 | | Gl | 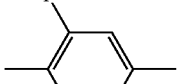 |
| th | 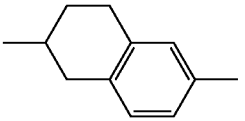 | | Ul | 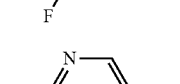 |
| th2f | 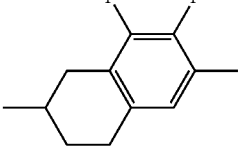 | | Ml | 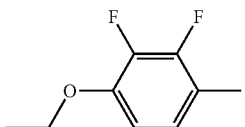 |
| | | | Nl | 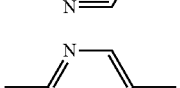 |

TABLE A-continued

Ring Elements n3fl 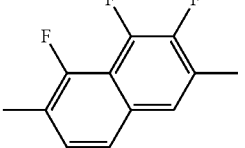

thl th2fl o2fl

KI

LI

Fl

TABLE B

Linking Groups

| | | | |
|---|---|---|---|
| E | —CH$_2$—CH$_2$— | | |
| V | —CH=CH— | | |
| T | —C≡C— | | |
| W | —CF$_2$—CF$_2$— | | |
| B | —CF=CF— | | |
| Z | —CO—O— | ZI | —O—CO— |
| X | —CF=CH— | XI | —CH=CF— |
| O | —CH$_2$—O— | OI | —O—CH$_2$— |
| Q | —CF$_2$—O— | QI | —O—CF$_2$— |

TABLE C

End Groups

| Left hand side, used alone or in combination with others | | Right hand side, used alone or in combination with others | |
|---|---|---|---|
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | CH$_2$=CH— | -V | —CH=CH$_2$ |
| -nV- | $C_nH_{2n+1}$—CH=CH— | -nV | —$C_nH_{2n}$—CH=CH$_2$ |
| -Vn- | CH$_2$=CH—$C_nH_{2n}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |

| Left hand side, used in combination with others only | | Right hand side, used in combination with others only | |
|---|---|---|---|
| -...n...- | —$C_nH_{2n}$— | -...n... | —$C_nH_{2n}$— |
| -...M...- | —CFH— | -...M... | —CFH— |
| -...D...- | —CF$_2$— | -...D... | —CF$_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each are integers and three points " . . . " indicate a space for other symbols of this table.

Preferably the liquid crystalline media according to the present invention comprise, besides the compound(s) of formula I one or more compounds selected from the group of compounds of the formulae of the following table.

TABLE D

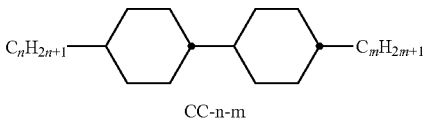
CC-n-m

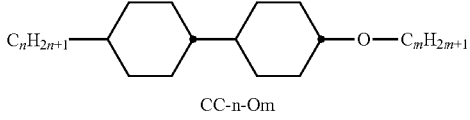
CC-n-Om

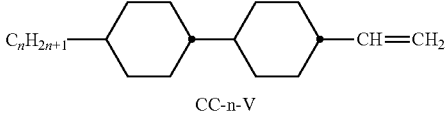
CC-n-V

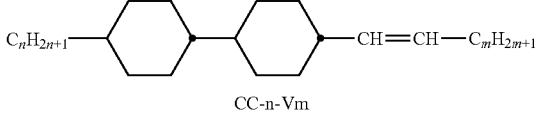
CC-n-Vm

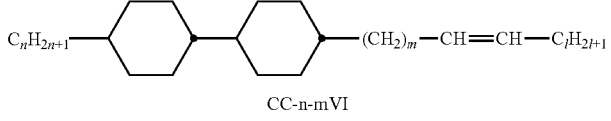
CC-n-mVl

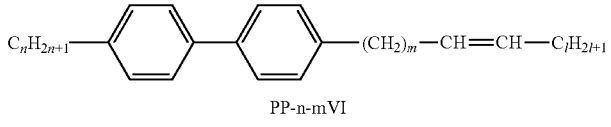
PP-n-mVl

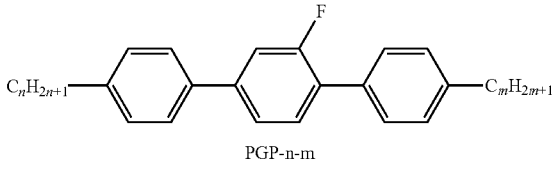
PGP-n-m

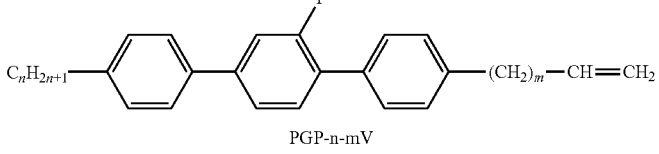
PGP-n-mV

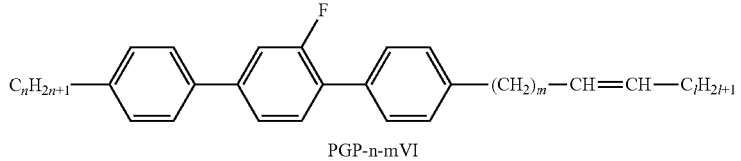
PGP-n-mVl

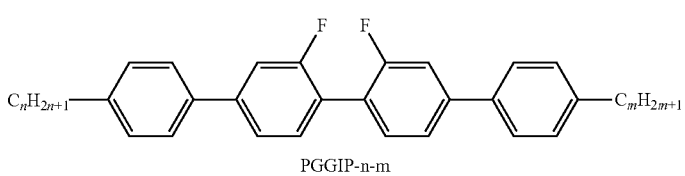
PGGIP-n-m

TABLE D-continued
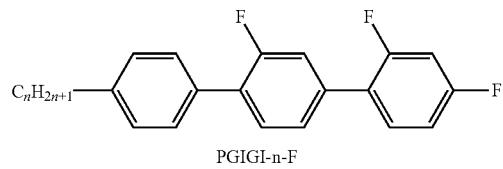
PGIGI-n-F
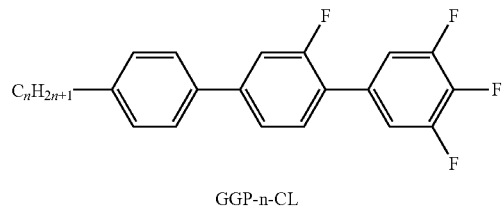
GGP-n-CL
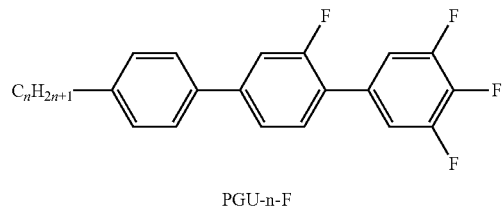
PGU-n-F
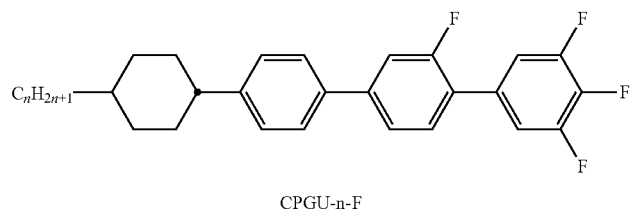
CPGU-n-F
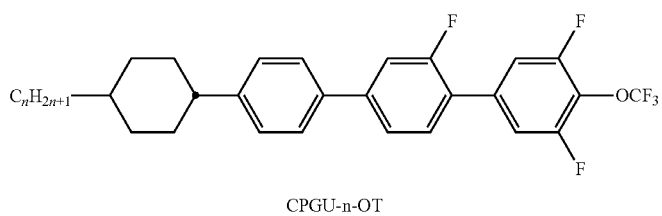
CPGU-n-OT
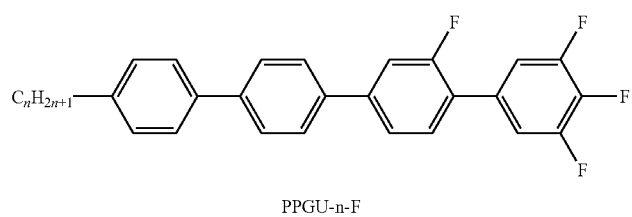
PPGU-n-F
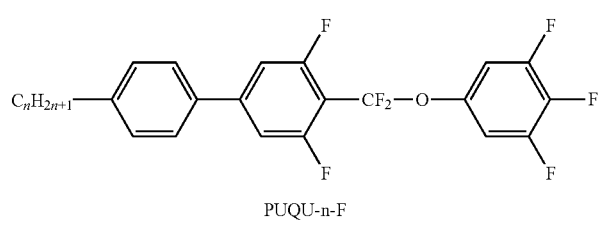
PUQU-n-F TABLE D-continued
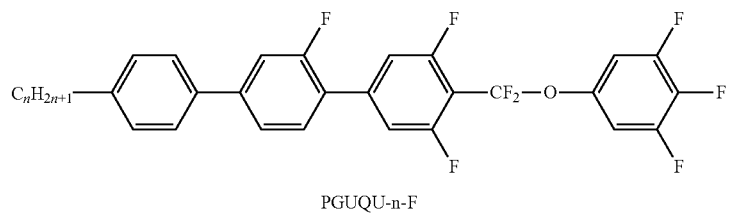
PGUQU-n-F
Table E lists chiral dopants, which are preferably used in the liquid crystalline media according to the present invention.
TABLE E
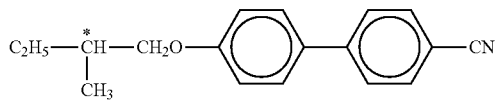
C 15
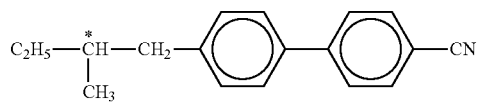
CB 15
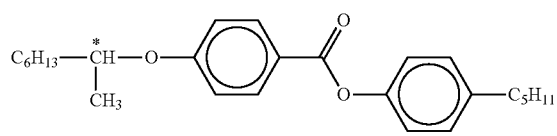
CM 21
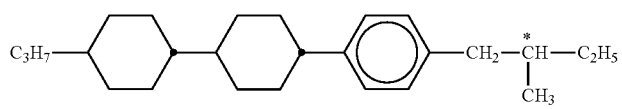
CM 44
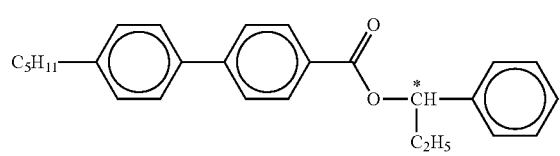
CM 45
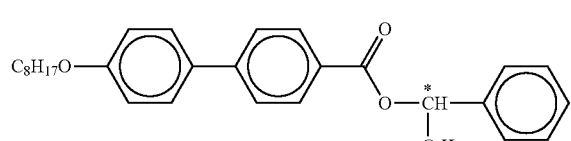
CM 47

TABLE E-continued
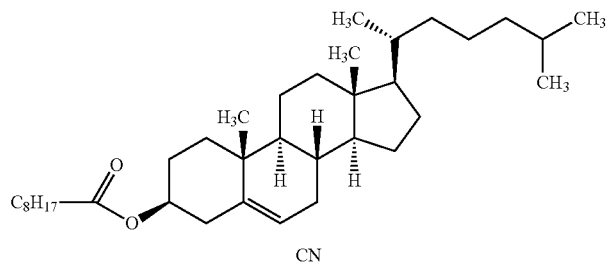
CN
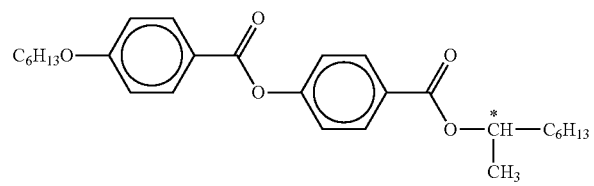
R S-811/S-811
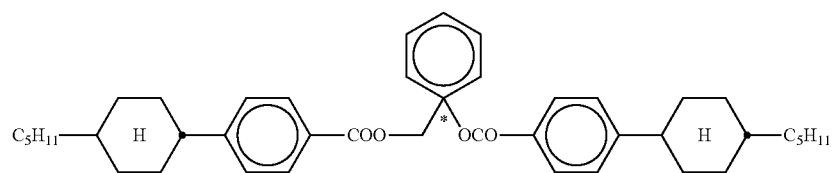
R-1011/S-1011
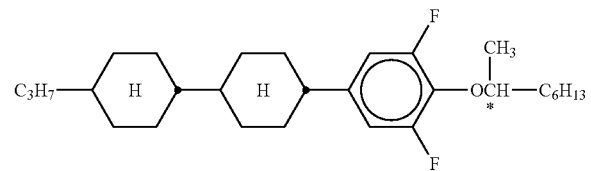
R-2011/S-2011
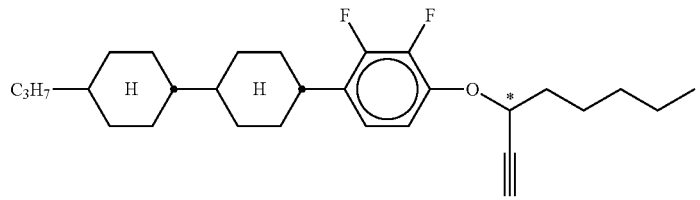
R-3011/S-3011
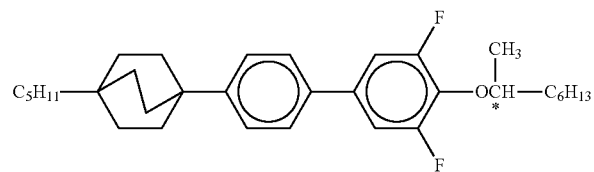
R-4011/S-4011

TABLE E-continued
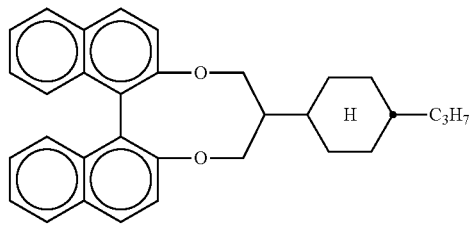
R-5011/S-5011
In a preferred embodiment of the present invention the media according to the present invention comprise one or more compounds selected from the group of compounds of table E.
Table F lists stabilizers, which are preferably used in the liquid crystalline media according to the present invention.
TABLE F
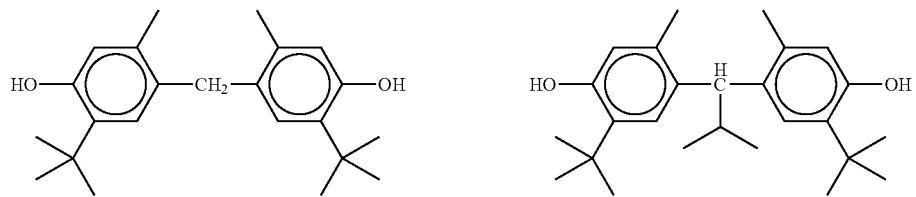
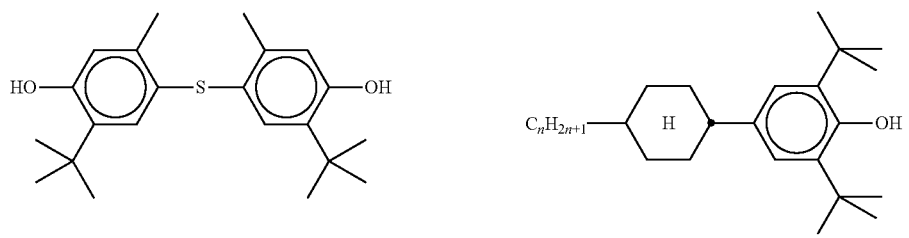
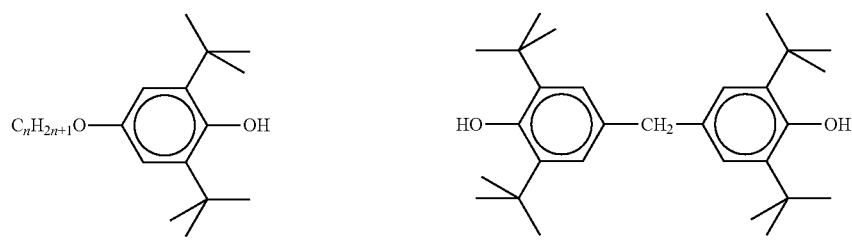

TABLE F-continued
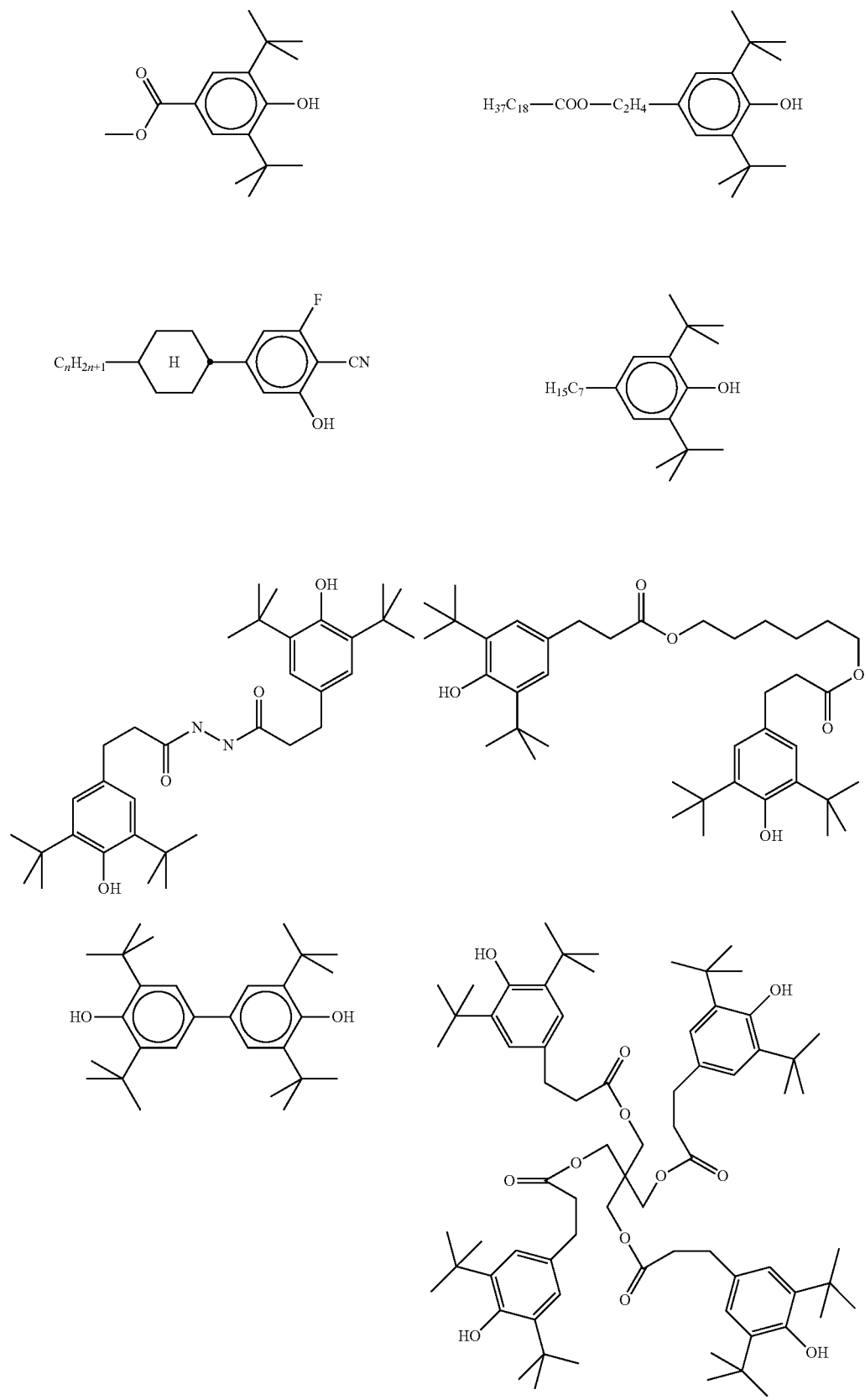

TABLE F-continued
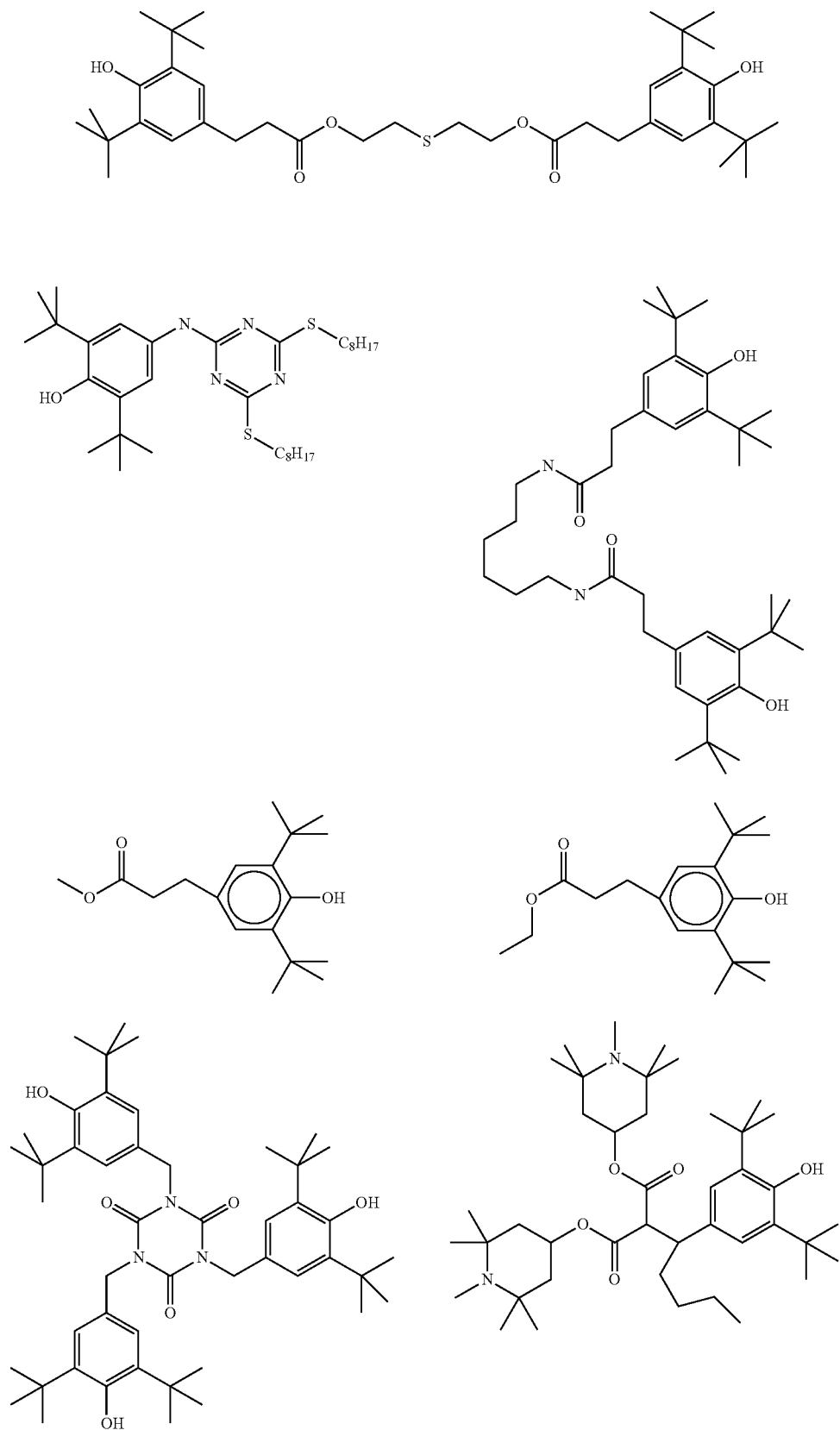

TABLE F-continued
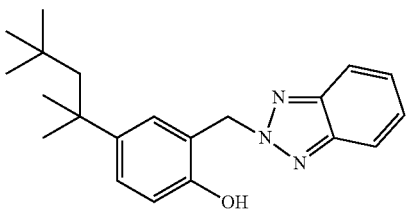
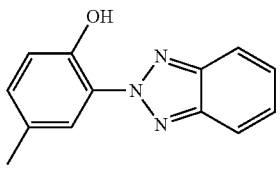
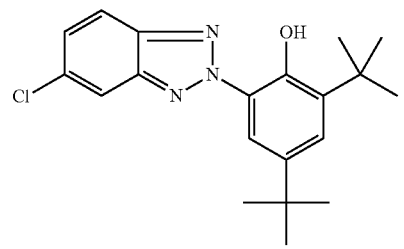
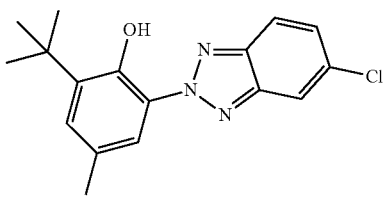
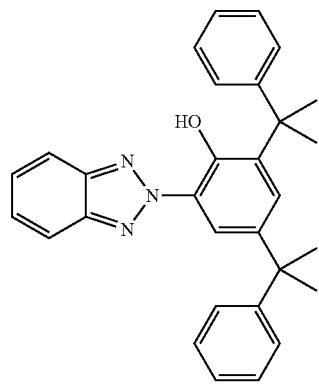
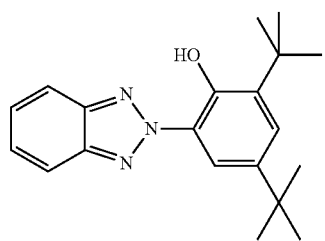
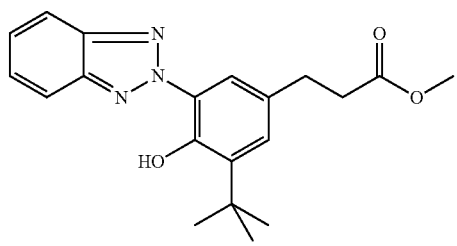
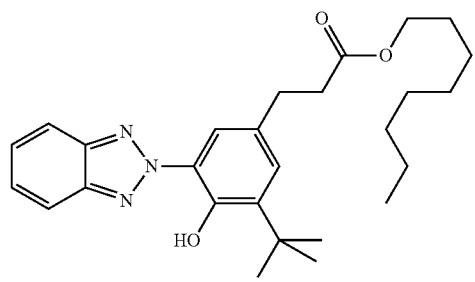
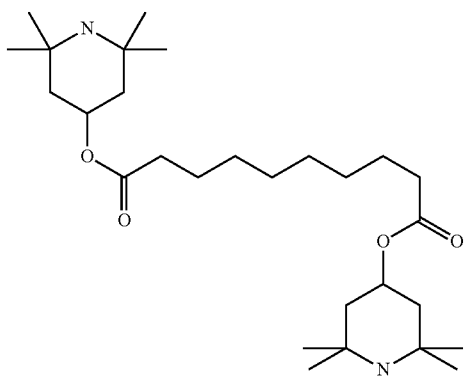
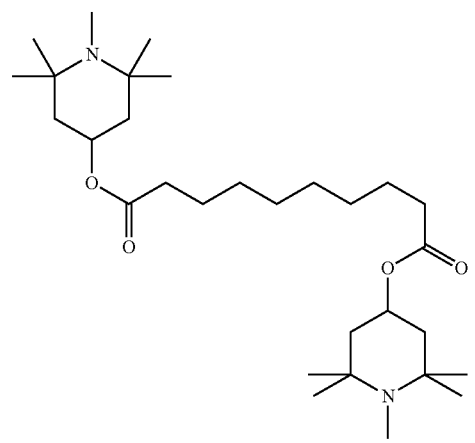

TABLE F-continued

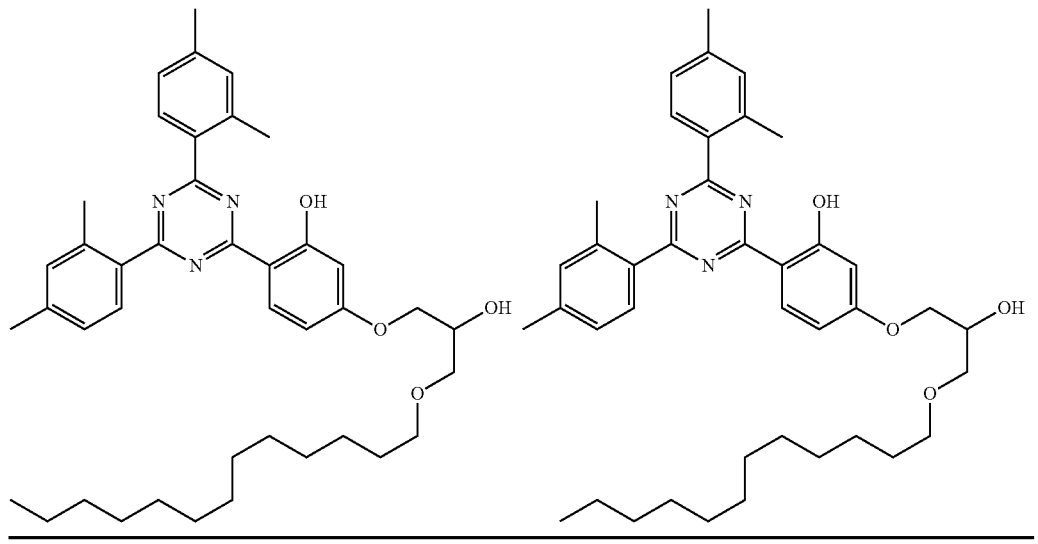

Remark: In this table "n" means an integer in the range from 1 to 12.

In a preferred embodiment of the present invention the media according to the present invention comprise one or more compounds selected from the group of compounds of table F.

The liquid crystalline media according to the present invention comprise preferably
- four or more, preferably six or more, compounds selected from the group of compounds of table D, preferably
- seven or more, preferably eight or more compounds, preferably compounds of three or more different formulae, selected from the group of formulae of table D.

EXAMPLES

The examples given in the following are illustrating the present invention without limiting it in any way.

However, the physical properties and compositions show illustrate for the expert, which properties can be achieved and in which ranges they can be modified. Especially the combination of the various properties, which can be preferably achieved, is thus well defined for the expert.

Liquid crystal mixtures are realized with the compositions and properties given in the following tables.

Their electro optical performance and their response times are investigated in TN-cells.

Example 1

TABLE 1

Composition and properties of liquid crystal mixture

| | Composition Compound | |
|---|---|---|
| No. | Abbreviation | Conc./% |
| 1 | MPP-3-F | 6.0 |
| 2 | MPP-5-F | 4.0 |
| 3 | CPGU-3-OT | 5.0 |
| 4 | PGUQU-3-F | 6.0 |

TABLE 1-continued

Composition and properties of liquid crystal mixture

| 5 | CC-3-V | 50.0 |
|---|---|---|
| 6 | CC-3-V1 | 4.0 |
| 7 | PP-1-2V1 | 9.0 |
| 8 | PGP-2-3 | 7.0 |
| 9 | PGP-2-4 | 9.0 |
| Σ | | 100.0 |

| Physical Properties | |
|---|---|
| T(N, I) = | 74.7° C. |
| $n_e$ (20° C., 589.3 nm) = | 1.6249 |
| $\Delta n$ (20° C., 589.3 nm) = | 0.1310 |
| $\epsilon_{\|\|}$ (20° C., 1 kHz) = | 6.3 |
| $\Delta\epsilon$ (20° C., 1 kHz) = | 3.5 |
| $V_{10}$ (20° C.) = | 2.35 V |
| $V_{50}$ (20° C.) = | 2.75 V |
| $V_{90}$ (20° C.) = | 3.34 V |

Example 2

TABLE 2

Composition and properties of liquid crystal mixture

| | Composition Compound | |
|---|---|---|
| No. | Abbreviation | Conc./% |
| 1 | MPP-5-F | 10.0 |
| 2 | CPGU-3-OT | 3.0 |
| 3 | PGUQU-3-F | 7.5 |
| 4 | CC-3-V | 55.5 |
| 5 | PP-1-2V1 | 7.5 |
| 6 | PGP-2-2V | 16.5 |
| Σ | | 100.0 |

| Physical Properties | |
|---|---|
| T(N, I) = | 75.0° C. |
| $n_e$ (20° C., 589.3 nm) = | 1.6233 |

TABLE 2-continued

Composition and properties of liquid crystal mixture

| | |
|---|---|
| $\Delta n$ (20° C., 589.3 nm) = | 0.1297 |
| $\epsilon_{\parallel}$ (20° C., 1 kHz) = | 6.4 |
| $\Delta\epsilon$ (20° C., 1 kHz) = | 3.6 |
| $\gamma_1$ (20° C.) = | 48 mPa·s |
| $V_{10}$ (20° C.) = | 2.29 V |
| $V_{50}$ (20° C.) = | 2.70 V |
| $V_{90}$ (20° C.) = | 3.34 V |

Example 3

TABLE 3

Composition and properties of liquid crystal mixture

Composition

| Compound No. | Abbreviation | Conc./% |
|---|---|---|
| 1 | MPP-5-F | 10.0 |
| 2 | PPGU-3-F | 1.0 |
| 3 | CPGU-3-OT | 3.0 |
| 4 | PGUQU-3-F | 7.5 |
| 5 | CC-3-V | 55.0 |
| 6 | PP-1-2V1 | 8.5 |
| 7 | PGP-2-2V | 15.0 |
| Σ | | 100.0 |

Physical Properties

| | |
|---|---|
| T(N, I) = | 74.9° C. |
| $n_e$ (20° C., 589.3 nm) = | 1.6230 |
| $\Delta n$ (20° C., 589.3 nm) = | 0.1296 |

Example 4

TABLE 4

Composition and properties of liquid crystal mixture

Composition

| Compound No. | Abbreviation | Conc./% |
|---|---|---|
| 1 | MPP-5-F | 10.0 |
| 2 | PPGU-3-F | 0.5 |
| 3 | CPGU-3-OT | 4.5 |
| 4 | PGUQU-3-F | 8.0 |
| 5 | CC-3-V | 54.0 |
| 6 | PP-1-2V1 | 8.0 |
| 7 | PGP-2-2V | 15.0 |
| Σ | | 100.0 |

Physical Properties

| | |
|---|---|
| T(N, I) = | 76.9° C. |
| $n_e$ (20° C., 589.3 nm) = | 1.6244 |
| $\Delta n$ (20° C., 589.3 nm) = | 0.1312 |
| $\epsilon_{\parallel}$ (20° C., 1 kHz) = | 6.9 |
| $\Delta\epsilon$ (20° C., 1 kHz) = | 4.1 |
| $\gamma_1$ (20° C.) = | 49 mPa·s |
| $V_{10}$ (20° C.) = | 2.21 V |
| $V_{50}$ (20° C.) = | 2.59 V |
| $V_{90}$ (20° C.) = | 3.13 V |

The mixtures of examples 1 to 4 are well suited for displays operating in the TN-mode, especially for monitor applications.

The response times of the displays of the examples 1 to 4 have been determined at a temperature of 25° C. with an operation voltage of 6.0 V. The results are given in the following table.

| | Example | | | |
|---|---|---|---|---|
| | 1 | 2 | 3 | 4 |
| Cell Parameters at 20° C. | | | | |
| Cell gap/μm | 3.18 | 3.18 | 3.17 | 3.24 |
| $\Delta n$ | 0.1310 | 0.1297 | 0.1296 | 0.1312 |
| $(d \cdot \Delta n)/\mu m^{-1}$ | 0.417 | 0.412 | 0.4111 | 425 |
| Response Times at 25° C. | | | | |
| $\tau_{on}$/ms | 0.88 | 0.85 | 0.80 | 0.75 |
| $\tau_{off}$/ms | 3.17 | 3.17 | 3.12 | 3.15 |
| $\tau_{total}$/ms | 4.08 | 4.02 | 3.92 | 3.80 |

The invention claimed is:

1. A liquid crystal medium, comprising
one or more compounds of formula I

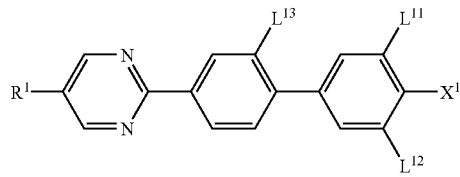

wherein
$R^1$ is alkyl, alkoxy, fluorinated, alkyl or fluorinated alkoxy, alkenyl, alkenyloxy, alkoxyalkyl, fluorinated alkenyl or fluorinated alkenyloxy,
$L^{11}$ to $L^{13}$ are independently of each other H or F, and
$X^1$ is F or Cl,
one or more compounds selected from the group consisting of compounds of formulae II and III

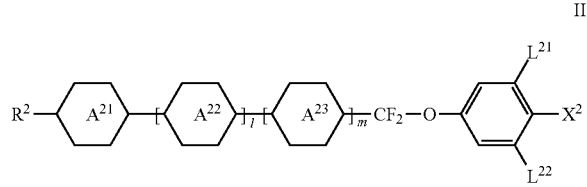

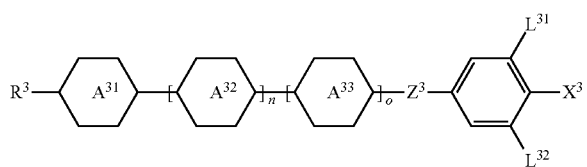

wherein
R² and R³, independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,

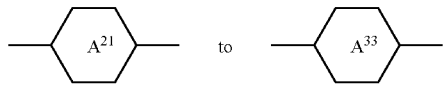

are independently of each other

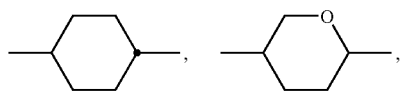

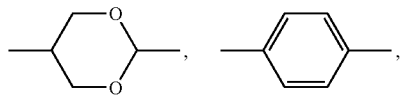

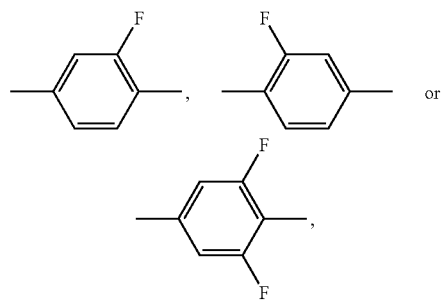

or

L²¹, L²², L³¹ and L³², are independently of each other H or F,
X² and X³ are independently of each other halogen, halogenated alkyl or alkoxy with 1 to 3 C-atoms or halogenated alkenyl or alkenyloxy with 2 or 3 C-atoms,
Z³ is —CH₂CH₂—, —CF₂CF₂—, —COO—, trans- —CH=CH—, trans- —CF=CF—, —CH₂O— or a single bond, and
l, m, n and o are independently of each other 0 or 1, and
one or more compounds selected from the group consisting of cmpounds of formulae IV and V

IV

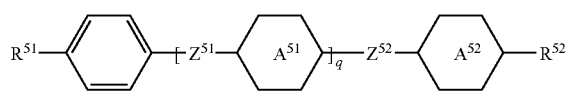

V wherein
R⁴¹ to R⁵² independently of each other have the meaning given for R² under formula II above, and

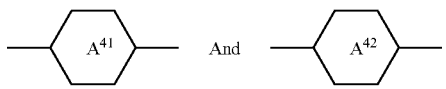

independently of each other and in case

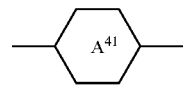

is present twice, also these independently of each other, are

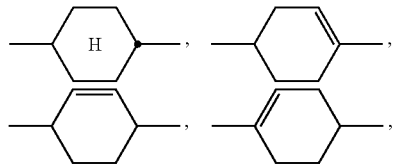

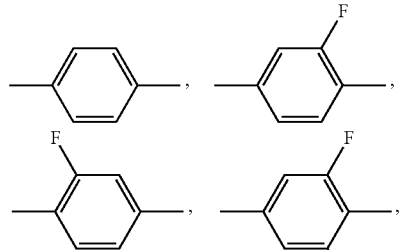

or

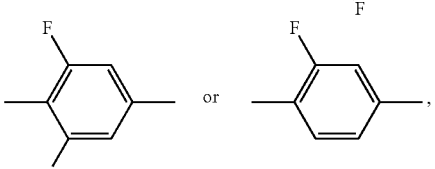

and independently of each other and in case

is present twice, also these independently of each other, are

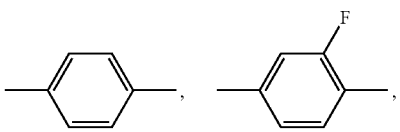

-continued

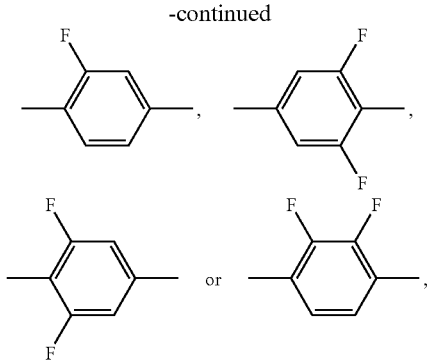

$Z^{41}$ to Z52 independently of each other, and in case $Z^{41}$ and/or $Z^{51}$ is/are present twice, also these independently of each other, are —CH$_2$CH$_2$—, —COO—, trans- —CH=CH—, trans- —CF=CF—, —CH$_2$O—, —CF$_2$O—, —C≡C— or a single bond, and p and q are independently of each other 0, 1 or 2, with the proviso that the medium comprises one or more compounds of formula III, wherein n and o both are 1 and all rings are 1,4-phenylene, which independently of each other optionally are fluorinated once or twice, and/or one or more compounds of formula V, wherein q is 2.

2. A liquid crystal medium according to claim 1, comprising one or more compounds of formula III, wherein n and o both are 1 and all rings are 1,4-phenylene, which independently of each other optionally are fluorinated once or twice.

3. A liquid crystal medium according to claim 1, comprising one or more compounds of formula V, wherein q is 2.

4. A liquid crystal medium according to claim 1, wherein the total concentration of one or more the compounds of formula I in the medium is in the range from 1% to 35%.

5. A liquid crystal medium according to claim 1, comprising one or more compounds of formula I-1

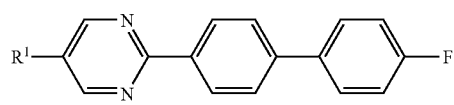

I-1 wherein $R^1$ has is alkyl, alkoxy, fluorinated alkyl or fluorinated alkoxy, alkenyl, alkenyloxy, alkoxyalkyl, fluorinated alkenyl or fluorinated alkenyloxy.

6. A liquid crystal medium according to claim 1, comprising one or more compounds of formula II-2c-1

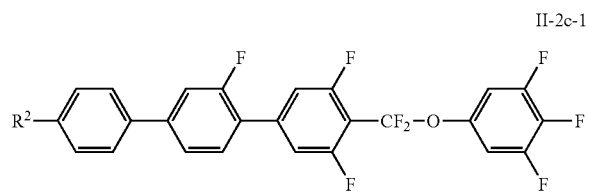

II-2c-1 wherein $R^2$ is are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms.

7. A liquid crystal medium according to claim 2, comprising one or more compounds of formula III-1d-1

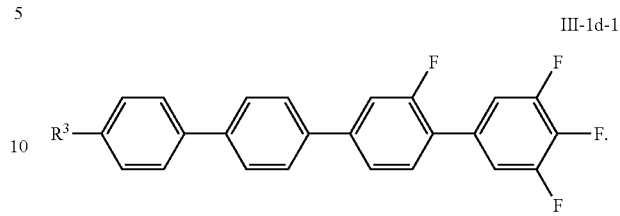

III-1d-1 wherein $R^3$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms.

8. A liquid crystal medium according to claim 3, comprising one or more compounds of formula V-3

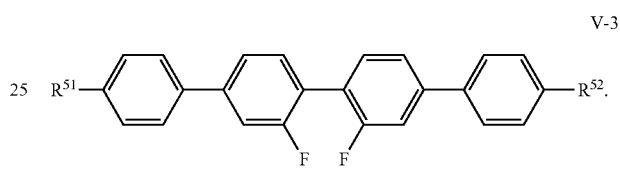

V-3 wherein $R^{51}$ and $R^{52}$, independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms.

9. A liquid crystal medium according to claim 1, comprising one or more compounds of formulae V-1 and/or V-2

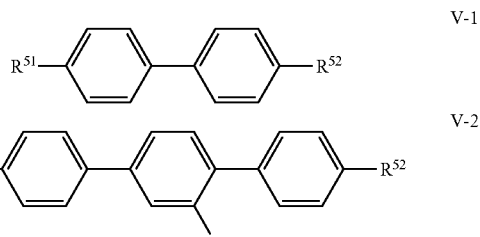

V-1

V-2 wherein $R^{51}$ and $R^{52}$ independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms.

10. A liquid crystal display, comprising a liquid crystal medium according to claim 1.

11. A liquid crystal display according to claim 10, comprising active matrix addressing.

12. A method of generating an electrooptical effect comprising applying an electrical field to said liquid crystal medium of the liquid crystal display according to claim 10.

13. A method for preparing a liquid crystal medium according to claim 1, comprising mixing together one or more compounds of formula I, one or more compounds of formulae II and/or III and one or more compounds of formulae IV and/or V.

14. A method for stabilising a liquid crystal medium, comprising adding to said medium one or more compounds of formula III-1d-1

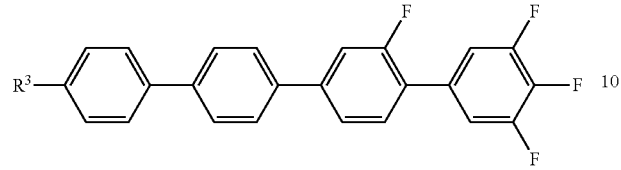

III-1d-1 wherein $R^3$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms.

15. A method for stabilising a liquid crystal medium, one or more compounds of formula V-3

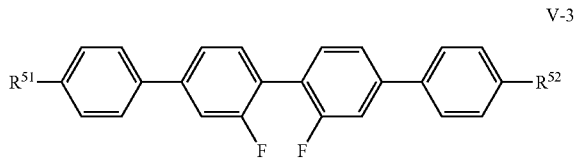

V-3 wherein $R^{51}$ and $R^{52}$, independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms.

16. A method of stabilising a liquid crystal medium, one or more compounds of formula V-2

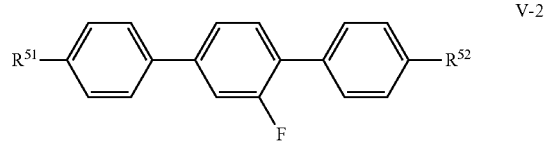

V-2 wherein $R^{51}$ and $R^{52}$, independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms.

* * * * *